US007770819B2

(12) United States Patent
Yu Chen

(10) Patent No.: US 7,770,819 B2
(45) Date of Patent: Aug. 10, 2010

(54) LINE MAKER

(76) Inventor: Hsiu-Man Yu Chen, No. 40, Sec. 1, Ta Fu Road, Tan Tzu Hsiang Taichung (TW) 427

( * ) Notice: Subject to any disclaimer, the term of this patent is extended or adjusted under 35 U.S.C. 154(b) by 453 days.

(21) Appl. No.: 11/864,994

(22) Filed: Sep. 29, 2007

(65) Prior Publication Data

US 2009/0084868 A1 Apr. 2, 2009

(51) Int. Cl.
*A01G 25/09* (2006.01)
*B05B 1/28* (2006.01)

(52) U.S. Cl. ...................................... 239/150; 239/146

(58) Field of Classification Search ................. 239/150, 239/146, 147, 164, 172, 175; 222/608, 612, 222/616; 404/83, 93, 94

See application file for complete search history.

(56) References Cited

U.S. PATENT DOCUMENTS 1,548,383 A * 8/1925 Pickersgill .................. 401/137
3,796,353 A * 3/1974 Smrt .......................... 222/612
3,871,557 A * 3/1975 Smrt .......................... 222/162
4,545,531 A * 10/1985 Williams .................... 239/150
6,102,305 A * 8/2000 Chapman et al. ............ 239/150
6,390,336 B1 * 5/2002 Orozco ....................... 222/162
7,163,353 B2 * 1/2007 Ramirez ...................... 404/93

* cited by examiner

*Primary Examiner*—Davis Hwu
(74) *Attorney, Agent, or Firm*—Ming Chow; Sinorica, LLC

(57) ABSTRACT

A line marker includes a main body and a rod. The main body has a wheel axle set at a bottom of its front side and rear side respectively and the wheel axle has two wheels fitted at its two ends. The main body also includes a paint-spraying base having a positioning hole and a pressing block located below and paralleled the positioning hole with a proper distance for pressing a spraying head to start spraying. The rod is connected with the main body by its lower portion, having a lever fixed at its upper end, connected with a pulling line by its one end. The pulling line has its other end connected with the pressing block to activate it to move. So, controlling the lever to pull the pulling line, the pressing block can be moved to activate the paint spray can to carry out spraying.

8 Claims, 5 Drawing Sheets

LINE MAKER

BACKGROUND OF THE INVENTION

1. Field of the Invention

This invention relates to a line marker, particularly to one able to easily draw a line with a paint spray can.

2. Description of the Prior Art

Commonly, lime powder and paint are used as line marking materials drawn on the ground. The line drawn with lime powder is apt to become blurred after a short period of time, possible to cause an accident if it is an important sign. Paint, a durable material with a property of good adhesion, is of course a good option for line marking, especially done by spraying. But, in order to keep on spraying the paint, a user's finger has to press on the spraying nozzle continuously, not only making the finger feel uncomfortable, but also unable to obtain an evenly drawn line.

SUMMARY OF THE INVENTION

The objective of this invention is to offer a line marker.

The main characteristics of the invention are a main body and a rod. The main body has a wheel axle installed at a bottom of its front side and rear side respectively and the wheel axle has two wheels pivotally fitted at its two ends. The main body also includes a paint spraying base located in its front portion, provided with a positioning hole for loading a paint spray can positioned upside down and a pressing block located below and paralleled the positioning hole with a proper distance for pressing a spraying nozzle of the paint spray can to carry out spraying. The rod is connected with the main body by its lower portion, having a lever pivotally fixed at its upper end, connected with a pulling line by its one end. The pulling line has its other end connected with the pressing block so as to activate it to move. So, controlling the lever to pull the pulling line, the pressing block can be moved to activate the paint spray can to spray out. In addition, by means of two adjustment bolts fixed along two adjusting slots bored at two sides of the main body, the paint spraying base can be positioned at diverse levels to change the distance between the spraying nozzle and the ground.

BRIEF DESCRIPTION OF DRAWINGS

This invention is better understood by referring to the accompanying drawings, wherein.

DETAILED DESCRIPTION OF THE PREFERRED EMBODIMENT

Figure 1:
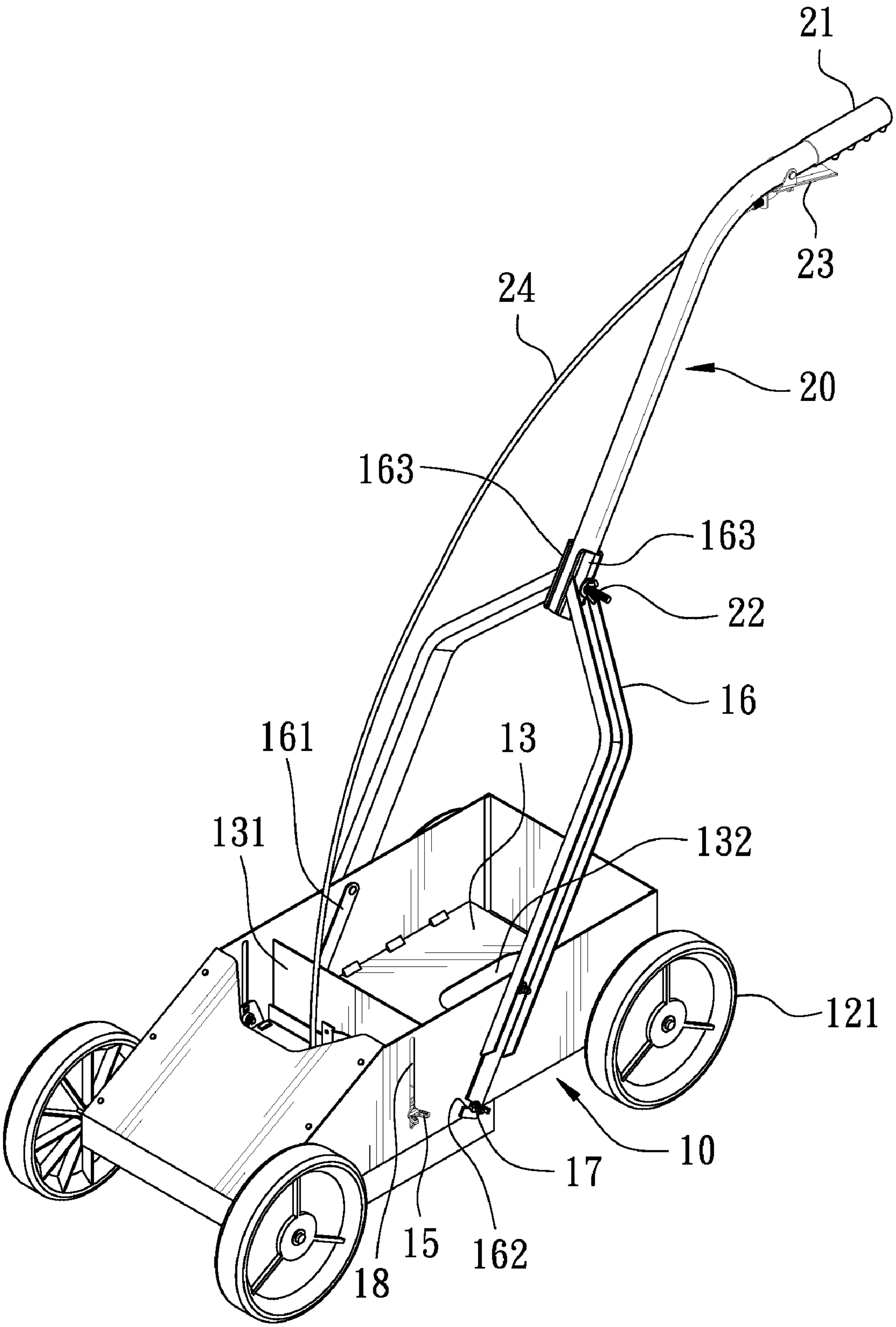
FIG. 1 is a perspective view of a preferred embodiment of a line marker in the present invention.
Figure 2:
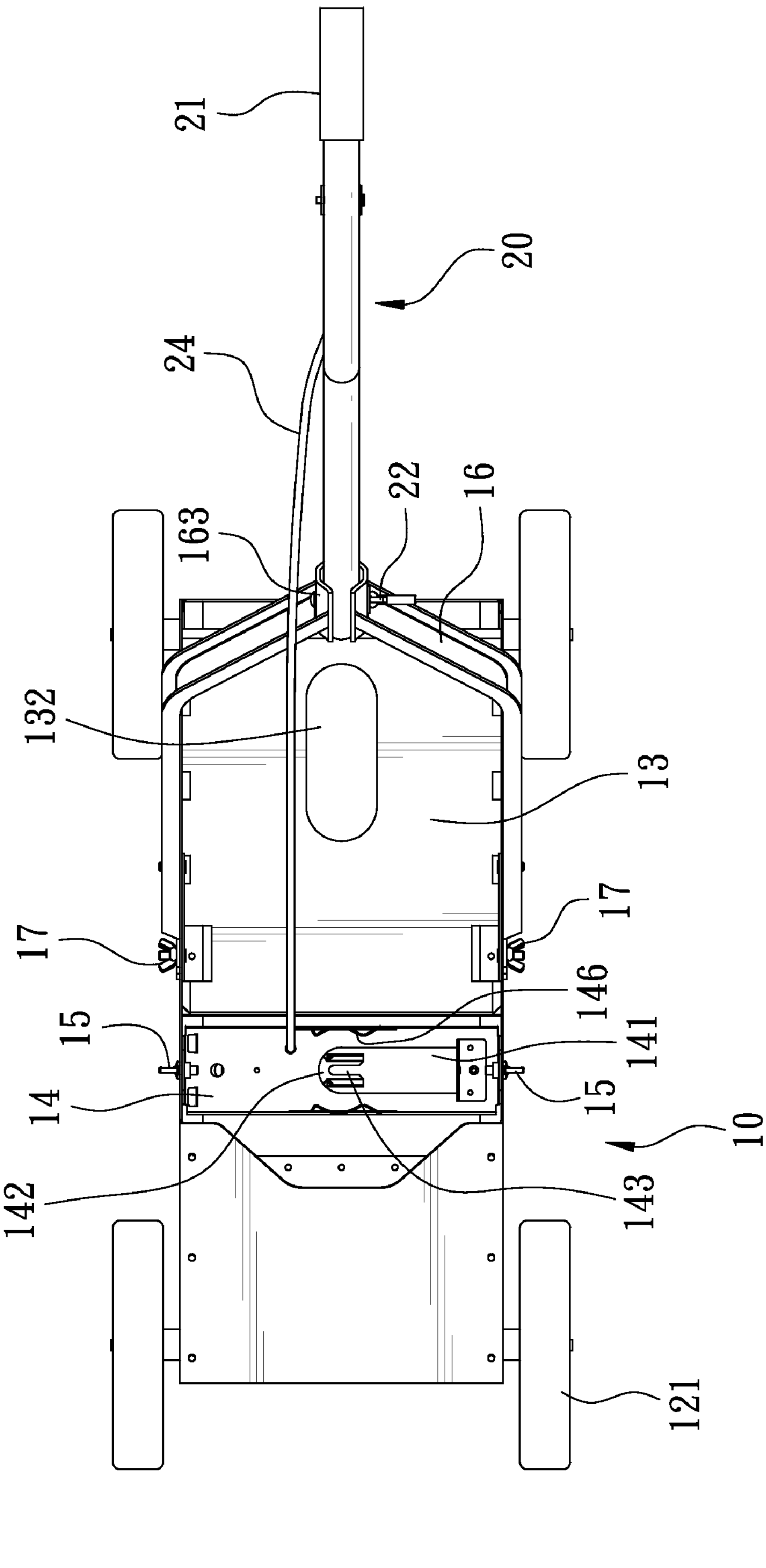
FIG. 2 is a top view of the preferred embodiment of a line marker in the present invention.
Figure 3:
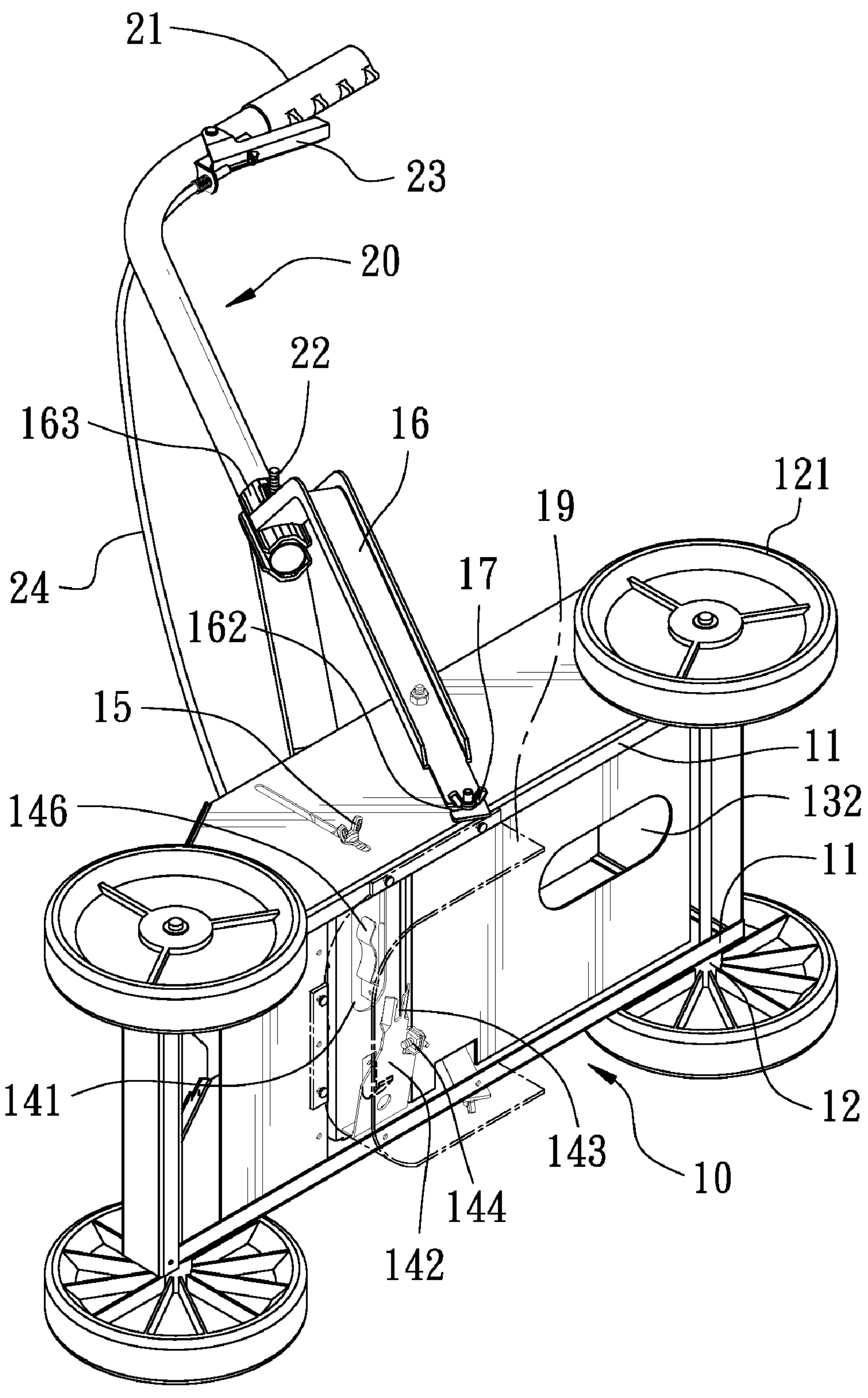
FIG. 3 is a bottom view of the preferred embodiment of a line marker in the present invention.
Figure 4:
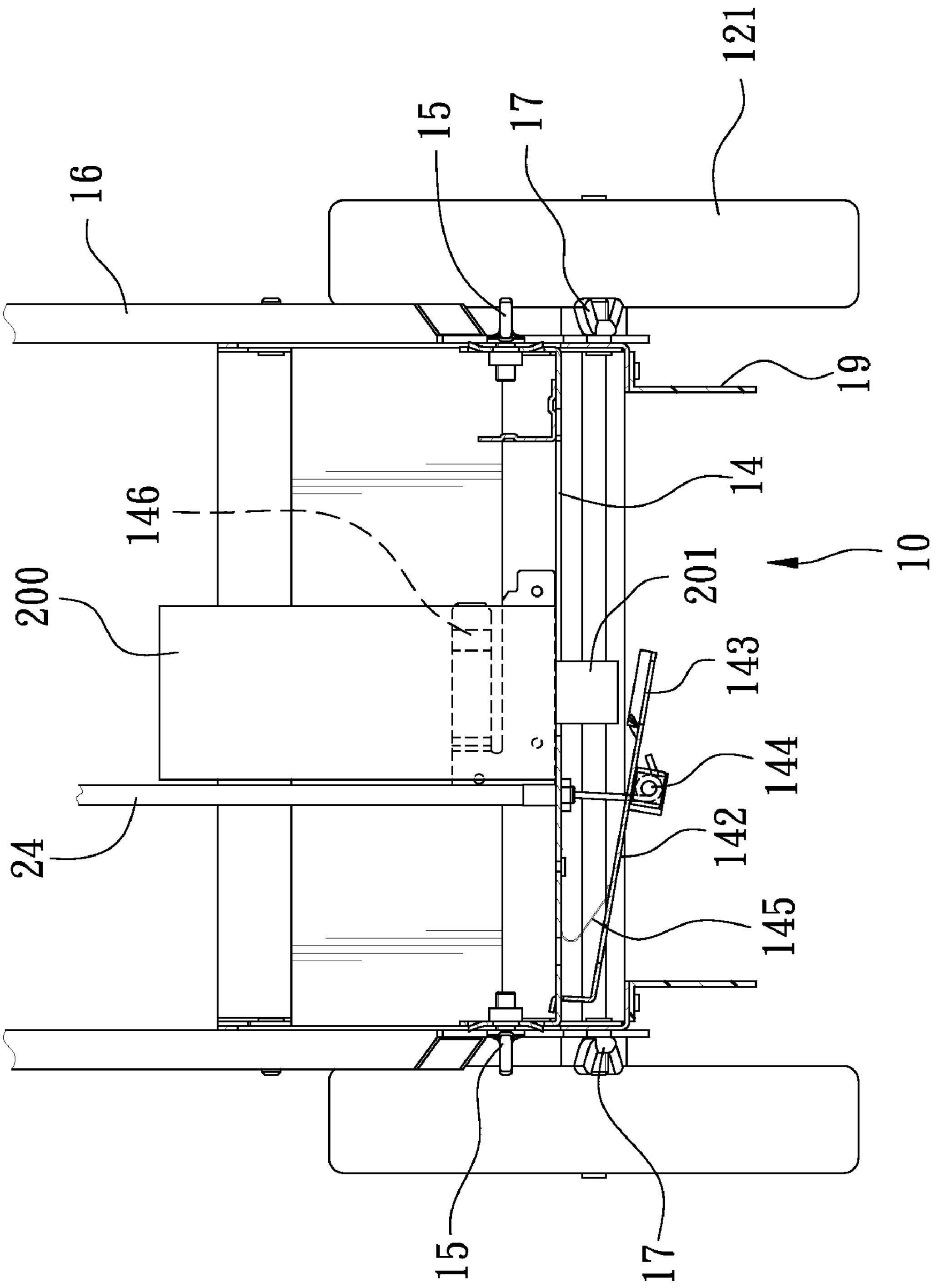
FIG. 4 is a partial front view of the preferred embodiment of a line marker in the present invention, showing it being loaded with a paint spray can.

As shown in FIGS. 1~4, a preferred embodiment of a line marker in the present invention is composed of a main body 10 and a rod 20.

The main body 10 is formed similar to a rectangle made up of four pieces of boards, which include a front board positioned obliquely, and two side boards and a rear board positioned vertically. The main body 10 is provided with a wheel axle 12 installed at the bottom of its front side and rear side respectively. The wheel axle 12 has two wheels 121 pivotally fitted at its two ends. A carrying base 13 provided in the main body 10 is made of a board connected with the two side boards of the main body, provided with an accommodating hole 132 and a partition 131 positioned vertically at its front side for separating the carrying base 13 and a paint spraying base 14. The main body 10 is also provided with an adjustment bolt 15 located at the outside of it two sides respectively for fixing with a Y-shaped frame 16, which is provided with a steel strip 161 located inside and fixed to the carrying base 13 correspondingly at two sides respectively for reinforcing the lower portion of the Y-shaped frame 16, and a recess 162 cut at its two ends respectively to pivotally fix with the bottom of the steel strip 161. The paint spraying base 14 located in the front portion of the main body 10 is positioned between two adjusting slots 18 bored at two sides of the main body 10 by means of two adjustment bolts 17 inserted on the adjusting slots 18. The paint spraying base 14 is provided with a positioning hole 141 bored at one side, a pressing block 142 fixed at the bottom of the other side and having a vertical surface formed integrally at one side for fixing on the bottom of the paint spraying base 14, and an U-shaped groove 143 formed at the other side of the pressing block 142 to parallel the positioning hole 141 below it, positioned appropriately so as to press a spraying nozzle 201 of a paint spray can 200. Installed between the paint-spraying base 14 and the pressing block 142 is an elastic element 145, which, formed integrally as an U-shaped strip, is fixed at the bottom of the paint-spraying base 14 at one end and leans on the pressing block 142 at the other end. The paint-spraying base 14 is also provided with two elastic restricting pieces 146 set in the intermediate portion for guiding the paint spray can 200 to position upside down and clamping it restrictively. In addition, there is an arc-like board 19 provided at the front bottom of the main body 10, fixed deadly at a proper location of the vertical surface of the paint-spraying base 14.

The rod 20 is provided with a grip 21 formed at its upper end, an adjustment bolt 22 used to connect it with two clamping plates 163 provided at two ends of the Y-shaped frame 16, a lever 23 installed under the grip 22, and a pulling line 24 penetrating through the front end of the lever 23. The pulling line 24 is wrapped by a plastic tube that is connected fixedly at an inner bottom of the lever 23 at one end and at a proper position of the paint-spraying base 14 at the other end. The pulling line 24 having its two ends extended out of the plastic tube is connected at the front end of the plastic tube by its one end and at a locking piece 144 of the pressing block 142 by the other end. So, the lever 23 can drive the pulling line 24 to move so as to enable the spraying nozzle 201 of the paint spray can 200 to work.

The line marker according to the invention is collapsible, saving space for a user and providing economical package and delivery for manufacturers. First, keep the recesses 162 loosened and remove the Y-shaped frame 16 therein. By the time, the rod 20 can be brought together with the Y-shaped frame 16 to be folded forward to rest on the main body 10, keeping the rod 20 folded to stay upwards in the Y-shaped frame 16. Next, lock up the adjustment bolt 22 again to keep the rod 20 immovable. So far, the Y-shaped frame 16 and the rod 20 are totally laid in the main body 10, with the line marker becoming smaller in size for storing.

Figure 5:
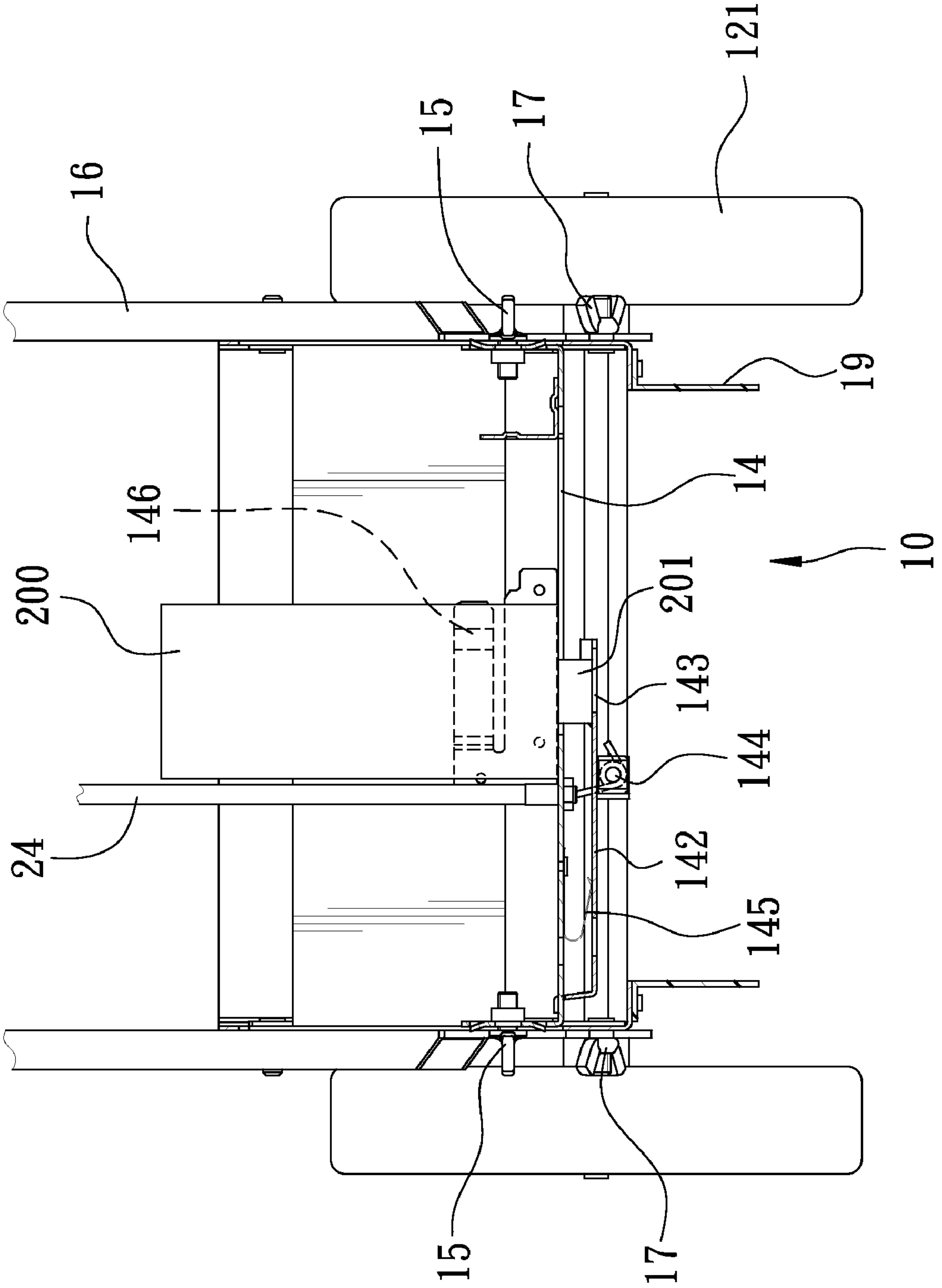
FIG. 5 is a partial front view of the preferred embodiment of a line marker in the present invention, showing a spraying head of the paint spray can be actuated to work.

In using, as shown in FIG. 5, the paint spray can 200 is guided by the elastic restricting pieces 146 of the paint spraying base 14 to be positioned upside down in the positioning hole 141 and clamped by the elastic restricting pieces 146 to prevent it from shaking. When paint is to be sprayed, the lever 23 has to be pressed to pull the pulling line 24, which is simultaneously to drag the pressing block 142 to squeeze the spraying head 201 of the paint spray can 200, activating the paint spraying can 200 to start spraying. Taking use of the adjustment bolts 17, the paint-spraying base 14 can be positioned at diverse levels so as to spray from different heights. Also, the carrying base 13 can be loaded with plural paint spray cans 200 and other stuff.

The invention has the following advantages as can be seen from the foresaid description.

1. With the pulling line 24 connected with the lever 23 by its upper end and the pressing block 142 by its lower end, the spraying nozzle 201 of the paint spray can 200 can be pressed by the pressing block 142 to start spraying when the lever 23 is clasped.

2. With the elastic element 145, the lever 23 can be automatically pulled back once it is released to stop pulling the pressing block 142, so as to prevent the spraying nozzle 201 of the paint spray can 200 from spraying continuously.

3. By means of the elastic restricting pieces 146, the paint spray can 200 can be easily positioned upside down in the positioning hole 141 and clamped by them to avoid shaking, with the spraying nozzle 201 of the paint spray can 200 leaning right in the U-shaped recess 143.

4. With the grip 21 set at the upper end of the rod 20 and wheels 121 installed at the bottom of the main body 10, the line marker is such ergonomic that it can not only precisely carry out drawing line, but also free a user from manually holding the paint spray can 200.

5. The Y-shaped frame 16 and the rod 20 can be folded to rest in the main body 10 to lessen the bulk of the invention, achieving an economical package and delivery and saving storing space.

6. The arc-like board 19 can not only remove rather large sands away on the ground, but also obstruct wind and sands to help spraying done in a good condition.

7. The carrying base 13 can be additionally loaded with the paint spray cans 200 and other stuff to make the line marker convenient for placing things.

While the preferred embodiment of the invention has been described above, it will be recognized and understood that various modifications may be made therein and the appended claims are intended to cover all such modifications that may fall within the spirit and scope of the invention.

What is claimed is:

1. A line marker comprising:

a main body provided with a wheel axle installed at a bottom of its front side and rear side respectively, said wheel axle having two wheels pivotally fitted at its two ends, said main body also provided with a paint spraying base located in its front portion that is provided with a positioning hole for accommodating a paint spray can positioned upside down and a pressing block located below and paralleled to said positioning hole with a proper distance correspondingly spaced apart from a spraying nozzle of said paint spray can for pressing said spraying nozzle to carry out spraying, an elastic element installed between one end of said pressing block and said paint spraying base;

a rod connected with said main body by its lower portion and provided with a lever pivotally fixed at its upper end that is connected with a pulling line by its one end, said pulling line connected with one end of said pressing block so as to remove the pressing block to press said spraying nozzle of said paint spray can to start spraying, said lever controlled to keep said pulling line pulled up or released; and said main body is provided with a Y-shaped frame pivotally fixed at its two sides and connected with said rod by locking with an adjustment bolt, said rod able to be folded to rest in said Y-shaped frame after loosening said adjustment bolt.

2. A line marker as claimed in claim 1, wherein said main body is provided with a carrying base set at its rear portion for storing said paint spray cans and other stuff.

3. A line marker as claimed in claim 1, wherein said paint spraying base is provided with two elastic restricting pieces installed at a top of two sides of said pressing block for clamping said paint spray can stably.

4. A line marker as claimed in claim 1, wherein said main body is provided with an adjusting slot bored longitudinally at two sides of said main body respectively, and said adjusting slots are used to alter the level of said paint spraying base by means of an adjustment bolt movably inserted in said adjusting slots so as to adjust the distance between said paint spray can and the ground.

5. A line marker as claimed in claim 1, wherein said pressing block is formed with an U-shaped groove at one end spaced properly apart from and paralleling said spraying nozzle, and connected pivotally at a bottom of said paint spraying base by the other end.

6. A line marker as claimed in claim 1, wherein said elastic element is an elastic U-shaped steel strip able to automatically push back said pressing block from said spraying nozzle of said paint spray can after releasing said lever.

7. A line marker as claimed in claim 1, wherein said Y-shaped frame is provided with a recess formed at two ends respectively for an adjustment bolt to lock at two sides of said main body, said Y-shaped frame able to be folded downward to rest on said main body after loosening said adjustment bolt.

8. A line marker as claimed in claim 1, wherein said pulling line is wrapped by a plastic tube that is connected fixedly with said lever by its upper end and connected with said pressing block by its lower end.

* * * * *